United States Patent [19]

Kotezawa et al.

[11] 4,034,295
[45] July 5, 1977

[54] RADIO COMMUNICATION SYSTEM FOR SIMULTANEOUS TELECOMMUNICATION BETWEEN RADIO STATIONS

[75] Inventors: Katsutaka Kotezawa; Toshimi Onodera; Setsuo Hayashi; Fujio Shimanuki, all of Funabashi, Japan

[73] Assignee: Chiba Communications Industries, Inc., Funabashi, Japan

[22] Filed: Jan. 28, 1976

[21] Appl. No.: 653,249

[30] Foreign Application Priority Data

Feb. 5, 1975  Japan ............................ 50-14378
Feb. 12, 1975  Japan ............................ 50-16811

[52] U.S. Cl. ...................... 325/39; 179/15.55 T; 343/178
[51] Int. Cl.² ........................................ H04B 1/00
[58] Field of Search ............ 343/178; 325/39; 179/15.55 T

[56] References Cited

UNITED STATES PATENTS

| | | | |
|---|---|---|---|
| 3,827,052 | 7/1974 | Tanaka | 343/178 |
| 3,846,827 | 11/1974 | Eppler, Jr. | 179/15.55 T |
| 3,950,617 | 4/1976 | Dildy, Jr. | 179/15.55 T |

*Primary Examiner*—Richard Murray
*Attorney, Agent, or Firm*—Johnson, Dienner, Emrich & Wagner

[57] ABSTRACT

A radio communication system for simultaneous telecommunication between a calling station and a called station, in which an aural signal to be transmitted from the calling station is divided by sampling pulses in the form of clock pulses of low frequency and is then suitably compressed with respect to the time axis to produce periodic signal-free time regions in the compressor output, so that an aural signal similarly compressed with respect to the time axis and transmitted from the called station can be received within these signal-free time regions. The received aural signal is expanded with respect to the time axis so that the original aural signal output of the microphone in the called station can be reproduced and applied to the speaker in the calling station. A zero cross synchronizing circuit is connected to the compressor to attain zero cross synchronization of the time-divided compressed aural signal and such aural signal is applied to the transmitter.

4 Claims, 6 Drawing Figures

RADIO COMMUNICATION SYSTEM FOR SIMULTANEOUS TELECOMMUNICATION BETWEEN RADIO STATIONS

BACKGROUND OF THE INVENTION

This invention relates to a radio communication system for simultaneous telecommunication between radio stations.

So-called simultaneous telecommunication referring to repetition of automatic alternate transmission and reception of aural information between radio stations has not been realized yet in the field of radio communications for the reasons described below. While the desired simultaneous telecommunication can be realized theoretically when a time division pulse signal of high frequency is utilized for the transmission and reception of an aural signal, utilization of such a high frequency infringes the Radio Law and is therefore impossible as a matter of fact. Although utilization of a time division pulse signal of low frequency does not infringe the Radio Law, intelligibility of reproduced aural information is too bad to be used for practical applications.

The inventors have now provided simultaneous telecommunication between a calling station and a called station in which a low frequency, which does not in any way infringe the Radio Law, can be used for time division transmission and reception of aural signals and which ensures intelligibility of reproduced aural information. The inventors have found that the desired simultaneous telecommunication can be achieved by subjecting an aural signal to time division by a low frequency in a calling station, compressing the time-divided aural signal with respect to the time axis, transmitting the compressed aural signal to a called station, expanding this compressed aural signal with respect to the time axis in the called station for reproducing the original aural signal originated in the calling station, and similarly compressing an aural signal in the called station for the purpose of automatic alternate transmission and reception of aural information between the stations.

BRIEF SUMMARY OF THE INVENTION

It is an object of the present invention to provide a novel and useful radio communication system for simultaneous telecommunication which is capable of automatic alternate exchange of aural information between a calling station and a called station.

Another object of the present invention is to provide a radio communication system of the kind above described which is capable of effecting zero cross synchronization of an aural signal to be transmitted by a transmitter.

In accordance with the present invention, there is provided a radio communication system for simultaneous telecommunication between a calling station and a called station comprising a transmitter, a receiver, a sampling pulse generator for generating sampling pulses in the form of clock pulses of low frequency used for sampling an aural signal applied from a microphone thereby dividing said aural signal at a suitable time division rate, a compressor for suitably compressing said sampled aural signal with respect to the time axis thereby producing periodic signal-free time regions in the output including said compressed aural signal, said compressor being connected to said transmitter and including memory means in which said sampled aural signal is written to be read out at a reading speed higher than the writing speed, a synchronizing signal generator for generating a synchronizing signal of low frequency synchronous with said aural signal compressed by said compressor thereby alternately turning on and off said transmitter and said receiver, and an expander connected to said receiver for expanding with respect to the time axis a time-divided and compressed aural signal transmitted from said called station and received by said receiver in said calling station during the signal-free time regions in which no aural signal portions compressed by said compressor appear in said calling station, thereby reproducing the aural signal output of the microphone in said called station and applying the reproduced aural signal to a speaker, said expander including memory means in which said received aural signal is written to be read out at a reading speed lower than the writing speed.

The radio communication system according to the present invention further comprises a zero cross synchronizing circuit comprising first circuit means for generating a first trigger pulse corresponding to each of the zero cross points of said compressed aural signal in response to the application of said compressed aural signal from said compressor, second circuit means for generating in response to the application of said synchronizing signal from said synchronizing signal generator a second trigger pulse corresponding to the first zero cross point of said compressed aural signal appearing after the application of said synchronizing signal, third circuit means for generating a third trigger pulse corresponding to the zero cross point of said compressed aural signal appearing immediately before the inversion of said synchronizing signal, and fourth circuit means for applying to said transmitter the aural signal portion appearing between the time at which said second trigger pulse generated by said second circuit means is applied thereto and the time at which said third trigger pulse generated by said third circuit means is applied thereto.

It will be seen that, according to the present invention, an aural signal is subject to time division by sampling pulses of low frequency, and this time-divided aural signal is compressed by the compressor with respect to the time axis, thereby producing periodic signal-free time regions in the compressor output including the compressed aural signal, so that an aural signal transmitted from the called station can be received by the receiver in the calling station within these periodic signal-free time regions. Therefore, simultaneous telecommunication between the calling station and the called station can be attained without infringing the Radio Law by the system adapted for automatic repetition of aural signal transmission and reception between the stations. A time-divided aural signal delivered from said compressor has been generally divided at a certain level higher or lower than the zero cross point. Such manner of time division has resulted in appearance of undesirable noises and higher harmonics depending on the period of time division and has thus given rise to various disadvantages including a degraded S/N ratio. The present invention eliminates such disadvantages due to the fact that the time-divided aural signal is applied to the zero cross synchronizing circuit to obtain a transmitter input which starts to appear at a time corresponding to one of the zero cross points and disappears at time corresponding to another zero cross point.

DETAILED DESCRIPTION OF THE INVENTION

Figure 2:
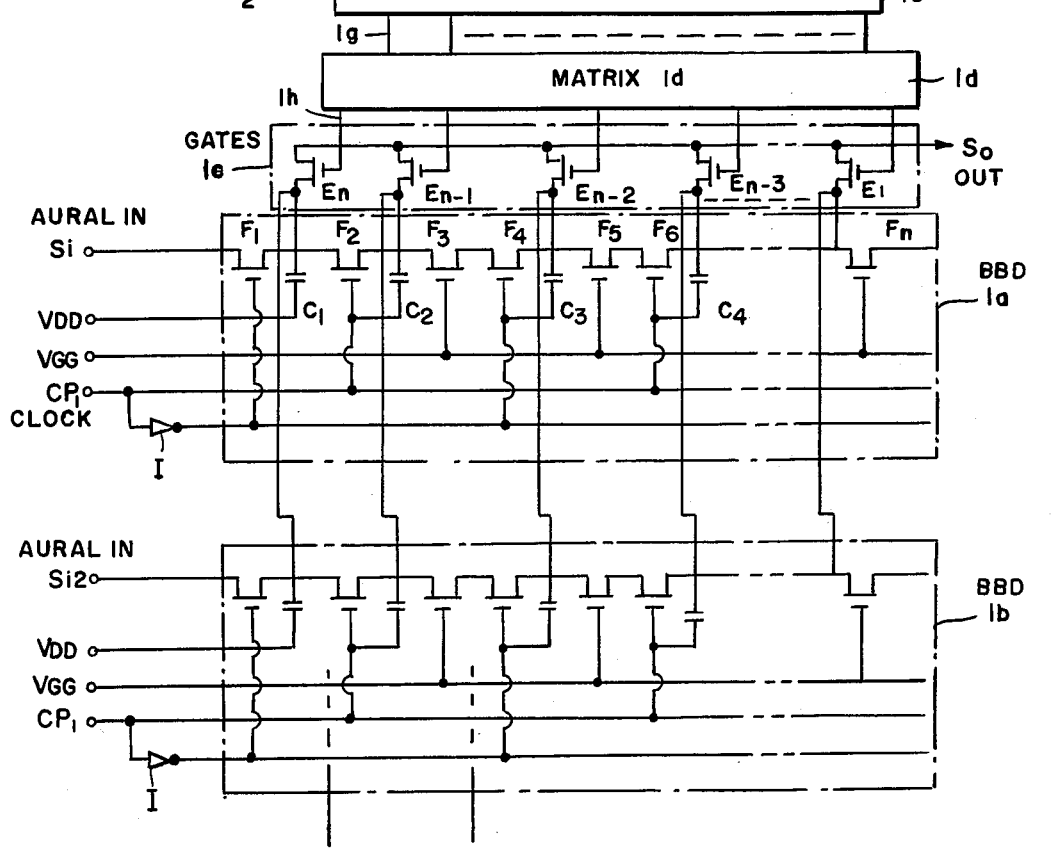
FIG. 2 shows a preferred practical structure of the compressor shown in FIG. 1.
Figure 3:
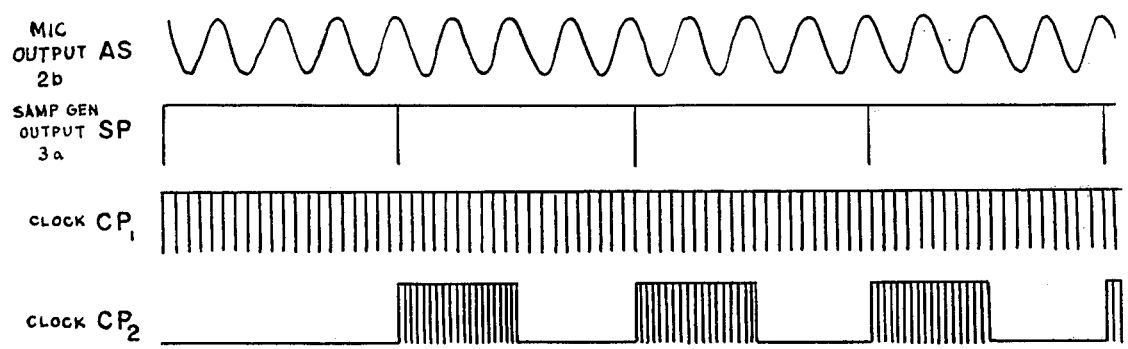
FIG. 3 shows waveforms appearing at various parts of FIG. 1 and 2.
Figure 3:
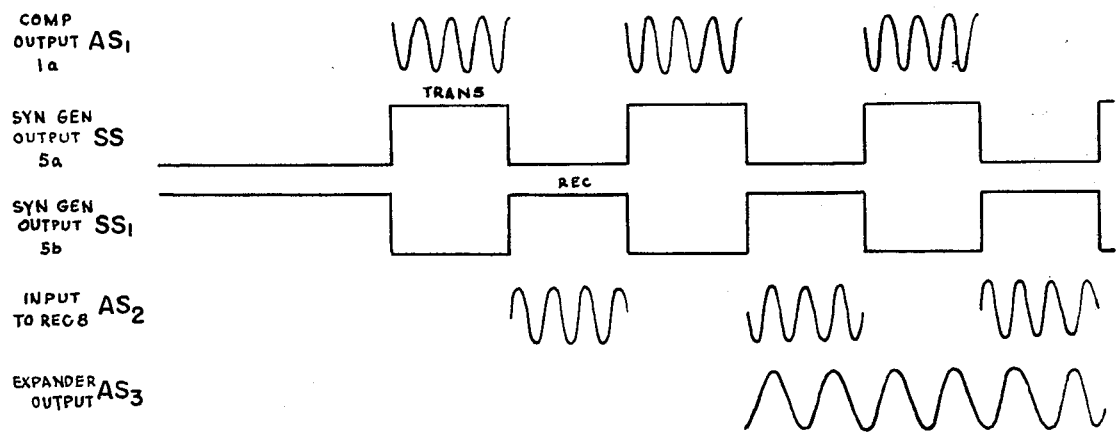

A preferred embodiment of the present invention will now be described in detail with reference to FIGS. 1 to 3.

Figure 1:
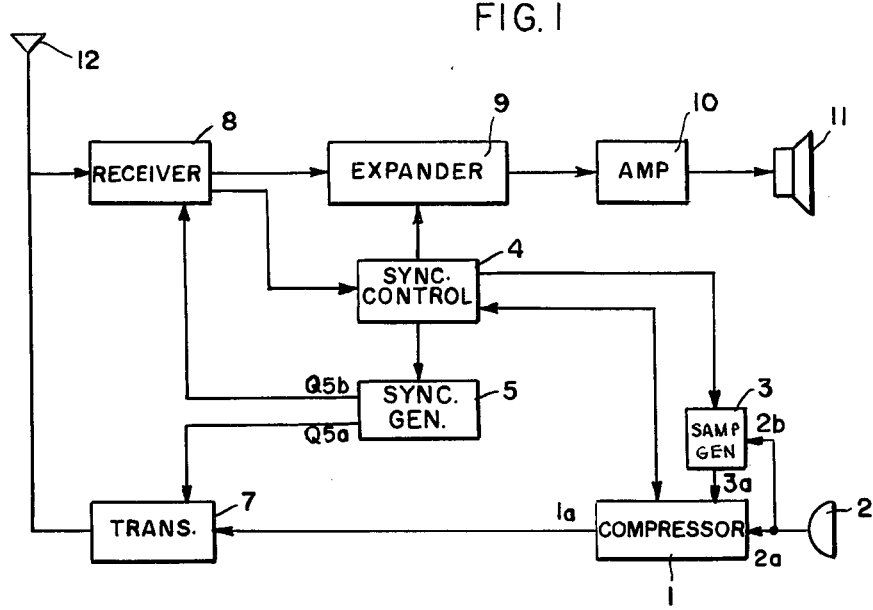
FIG. 1 is a block diagram of a preferred embodiment of the present invention.

FIG. 1 shows the structure of one form of the radio communication system of the present invention in a calling station, and it is apparent that the system of the same structure is disposed in a called station. Referring to FIG. 1, an aural signal output of a microphone 2 is applied to one intput terminal 2a of a compressor 1. A sampling pulse generator 3 applies a sampling pulse signal to another input terminal 3a of the compressor 1. This sampling pulse signal consists of clock pulses having a suitable low frequency. The aural signal applied from the microphone 2 to the compressor 1 is sampled by the sampling pulses applied from the sampling pulse generator 3, and this sampled aural signal is suitably compressed with respect to the time axis in the compressor 1. As a result, signal-free time regions, are periodically produced in the output of the compressor 1 regardless of the continuous appearance of the aural signal output from the microphone 2. The function of the compressor 1 is such that the aural signal sampled by the sampling pulses can be written and stored in a memory in this compressor 1, and this stored aural signal can be read out from the memory at a speed corresponding to the compression ratio, for sample, at a speed two times the speed of writing when the aural signal is compressed by a factor of two.

Such compressor 1 can therefore the practically provided by an desired one of various known structures suitable for the operation of the kind above described. A preferred practical form of the compressor 1 employing a BBD (bucket brigate device) will be described with reference to FIG. 2. Referring to FIG. 2, the memory for temporarily storing the sampled aural signal is comprised of a pair of BBD's 1a and 1b arranged in parallel for alternately storing the aural signal portions sampled by the sampling pulses. Describing in more detail, these BBD's 1a and 1b are each in the fom of an integrated circuit of FET's (field effect devices) and capacitors, and the aural signal portions applied alternately to the input terminals $Si_1$ and $Si_2$ of the first and second BBD's 1a and 1b can be written therein in response to the application of clock pulses $CP_1$ generated by a clock pulse generator (not shown). These clock pulses $CP_1$ are applied in such a manner that one clock pulse $CP_1$ is applied directly to the FET in one of the stages while the same clock pulse $CP_1$ is applied to the FET in the next adjacent stage through an inverter, and thus these clock pulse inputs have phase difference of 180° therebetween. Therefore, the FET's are turned on and off in response to the application of the clock pulses $CP_1$, and the charge stored in the capacitors shifts toward the right from the left in FIG. 2 for storing the successively sampled aural signal portions in the memory.

In the present inventin, the sampling pulse signal is used for dividiing the aural signal input to the compressor 1 at a predetermined period so that the time-divided aural signal portions can be alternately stored in the BBD's 1a 1b. Thus, the aural signal portion applied within one predetermined period of time is stored in the first BBD 1a, and that applied within the next predetermined period of time is stored in the second BBD 1b.

The sampling pulse generator 3 generating the sampling pulses is connected at the input terminal thereof to the output terminal of the microphone 2, and thus, it is energized in response to the appearance of the aural signal output from the microphone 2. The period of the sampling pulses is determined to comply with the Radio low while also taking into consideration the compression ratio of the compressor 1. When this compression ratio is two, a low frequency of the order of 20 mSec to 200 mSec is preferred for expecting high intelligibility without infringing the Radio Law.

The aural signal portions stored in the BBD's 1a and 1b are read out in response to the application of clock pulses $CP_2$ generated by another clock pulse generator (not shown). Referring to FIG. 2, these clock pulses $CP_2$ are applied to a counter 1c which counts a predermined number of the clock pulses $CP_2$, and the output terminals 1g of the successive bit positions or stages of the counter 1c are connected to the corresponding input terminals of a matrix 1d. The output terminals 1h of the matrix 1d are connected to the corresponding gates of an array of FET's 1e which act as read-out means and the number $E_n$ of whic is equal to that of the capacitors $C_1$–$C_n$ in the BBD's 1a and 1b. In response to the application of the output of the counter 1c, the FET's 1e are sequentially turned on in the order of from the right to the left in FIG. 2. Thus, this FET array operates in a manner smilar to a converter. Due to the sequential turn-on of the FET's 1e, the aural signal stored in the form of the charge in the capacitors is read out to appear at the output terminal $S_o$ of the compressor 1. Thus, when the frequency of the clock pulses $CP_2$ is selected to be higher than that of the clock pulses $CP_1$, the aural signal output appearing at the output terminal $S_o$ of the compressor 1 is compressed with respect to the time axis and divided with respect to time by the frequency determined by the frequency of the sampling pulses generated by the sampling pulse generator 3. The frequency of the clock pulses $CP_2$ is therefore selected to be two times the frequency of the clock pulses $CP_1$ when the compression ratio is two.

The clock pulse generator (not shown) generating the clock pulses $CP_2$ is energized in response to the application of the sampling pulses generated by the sampling pulse generator 3, and is automatically deenergized after sending out the clock pulses $CP_2$ of the number corresponding to the number of stages of the BBD's 1a and 1b. These clock pulses $CP_2$ are also alternately applied to the BBD's 1a and 1b so that the contents of the BBD 1b can be redad out in response to the application of the clock pulses $CP_2$ to the counter 1c during writing the aural signal in the BBD 1a while applying the clock pulses $CP_1$ to the BBD $1a$, and the contents of the BBD $1a$ can be read out in response to the application of the clock pulses $CP_2$ to the counter $1c$ during writing the aural signal in the BBD $1b$ while applying the clock pulses $CP_1$ to the BBD $1b$.

The output of the compressor 1 and the output of the receiver 8 are applied to a synchronizer control circuit 4 which applies a control signal to a synchronizing signal generator 5. The synchronizer control circuit 4 also applies a control signal to said compressor 1 and said sampling pulse generator.

Describing in more detail, the synchronizer control circuit 4 includes therein a squelch circuit, a voice switch and a NAND gate receiving inputs from the squelch circuit and voice switch. This synchronizer control circuit 4 acts to energize the synchronizing signal generator 5 when the compressor 1 is delivering an aural signal output and the receiver 8 is not delivering any aural signal output, while it acts to deenergize the synchronizing signal generator 5 whenever an aural signal output is appearing from the receiver 8. An output signal of the squelch circuit is applied to the compressor 1 and the sampling pulse generator 3, in order to lock the compressor 1 and the sampling pulse generator 3 when the receiver 8 is receiving the aural signal transmitted from the called station, namely, while the output of the squelch circuit is holding on.

The voice switch acts to rectify an aural signal applied thereto and delivers a pulse signal when the rectified signal level is higher than a predetermined value, and the squelch circuit is energized by noise contained in the output of the receiver 8 and delivers a pulse signal. Further, the output of the squelch circuit is applied to the NAND gate after being inverted by an inverter.

The synchronizing signal generator 5, which is controlled by the synchronizer control circuit 4 as above described, delivers a signal which is synchronous with the aural signal divided with respect to time and compressed by the compressor 1, thereby turning on the transmitter 7 while locking the receiver 8 when the aural signal output is appearing from the compressor 1 and no aural signal output is appearing from the receiver 8, and locking the transmitter 7 while turning on the receiver 8 when no aural signal output is appearing from the compressor 1. This synchronizing signal generator 5 is easily formed by, for example, an R-S flip-flop. In other words, an R-S flip-flop may be arranged to be triggered by the output of the synchronizer control circuit 4 so as to apply the Q output and $\overline{Q}$ output thereof to the transmitter 7 or receiver 8 respectively.

The transmitter 7 itself is a conventional one. This transmitter 7 is turned on and off by the output of the synchronizing signal generator 5 so that, when turned on, the aural signal output of the compressor 1 can be transmitted to the called station through an antenna 12. The receiver 8 is also a conventional one. The receiver 8 is turned on and off by the output of the synchronizing signal generator 5 so that, when turned on, an aural signal transmitted from the called station can be received through the antenna 12. The output of the receiver 8 is applied to the synchronizer control circuit 4 and to an expander 9.

The expander 9 has such a function that an aural signal compressed by the compressor in the called station and recieved by the receiver 8 in the calling station is expanded with respect to the time axis to be reproduced into the original aural signal. Thus, the expander 9 is similar in structure to the compressor 1 and comprises a pair of BBD's for alternately storing the portions of the aural signal transmitted from the called station and demodulated by the receiver 8, so that the contents of the BBD's can be read out in response to the application of reading clock pulses having a frequency lower than that of clock pulses used for writing. The frequency of the writing clock pulses is the same as that of the clock pulses $CP_2$ used for reading the aural signal portions in the BBD's $1a$ and $1b$. Therefore, the frequency of the reading clock pulses applied to the expander 9 is selected to be the reciprocal of the value obtained by dividing the frequency of the clock pulses $CP_2$ by the frequency of the clock pulses $CP_1$. Thus, the frequency of the reading clock pulses is selected to be one-half of that of the writing clock pulses when the compression ratio is two. The writing clock pulses and reading clock pulses applied to the expander 9 are controlled by the output of the synchronizer control circuit 4. More precisely, the manner of clock pulse control is such that one portion of the aural signal output of the receiver 8 is written in one of the BBD's in timed relation with the rise in the waveform of one output pulse of the squelch circuit in the synchronizer control circuit 4, and the next portion of the aural signal output of the receiver 8 is written in the other BBD in timed relation with the rise in the waveform of the next output pulse of the squelch circuit, while at the same time reading out the contents of the former BBD.

In this manner, the aural signal appearing from the microphone in the called station is reproduced by the expander 9 in the calling station into the from substantially the same as that of the original signal. This output of the expander 9 is applied to a speaker 11 after being amplifier by an amplifier 10.

The manner of simultaneous telecommunication according to the present invention will be described with reference to FIG. 3 which shows waveforms appearing at various parts of FIGS. 1 and 2. The description given hereinafter referes to the case in which the calling station A sends out radio waves earlier than the called station B.

An aural signal AS appearing from the microphone 2 in the calling station is applied to the sampling pulse generator 3, and the sampling pulses SP are generated by the sampling pulse generator 3 to control the operation of the compressor 1. The aural signal As is sampled by the sampling pulses SP, and the sampled aural signal portions are stored alternately in the BBD's $1a$ and $1b$ in the compressor 1 in response to the application of the clock pulses $CP_1$. The aural signal portions stored in the BBD's $1a$ and $1b$ are read out in response to the application of the clock pulses $CP_2$ generated by the clock pulse generator (not shown) which is controlled by the sampling pulses SP. Due to the fact that the frequency of the clock pulses $CP_2$ is higher than that of the clock pulses $CP_1$, the aural signal AS is suitably compressed with respect to the time axis, and the output of the compressor 1 includes periodic signal-free time regions in which no aural signal portions exist. In FIG. 3, the compression ratio is selected to be two. As a result of the compression the aural signal input AS to the compressor 1 is turned into an aural signal $AS_1$ which is divided with respect to time as shown, and this aural signal output $AS_1$ is applied to the transmitter 7.

The synchronizer control circuit 4 energizes the synchronizing signal generator 5 since no aural signal is being transmitted from the called station B at this time.

The synchronizing signal SS generated by the synchronizing signal generator 5 turns on the transmitter 7, and the receiver 8 is locked against operation by the inverted synchronizing signal $SS_1$. Since the synchronizing signal SS is synchronous with the aural signal $AS_1$ delivered from the compressor 1, the radio wave including this aural signal $AS_1$ as information is transmitted to the called station.

As this time, the receiver in the called station B is in the on state and receives the radio wave transmitted from the calling station. Upon interruption of the transmission of the radio wave, the radio wave including an aural signal output $AS_2$ of the compressor as information is similarly transmitted from the called station B to the calling station A. At this time, the transmitter 7 in the calling station is locked against operation due to disappearance of the synchronizinng signal SS, and the receiver 8 in the calling station A is turned on by the synchronizing signal $SS_1$ to be maintained in the on state. Therefore, the radio wave transmitted from the called station B to the calling station A through the antenna 12 is appled to the receiver 8 to be demodulated, and the demodulated aural signal is applied to expander 9 and synchronizer control circuit 4. The expander 9 is controlled by the output of the squelch circuit in the synchronizer control circuit 4 so that the aural signal $AS_2$ is written in to be stored in the BBD's in response to the application of the writing clock pulses, and the stored aural signal $AS_2$ is read out from the BBD's to be expanded with respect to the time axis in response to the application of the reading clock pulses having the frequency lower than that of the writing clock pulses. As a result, the original aural signal $AS_3$ appeared from the microphone in the called station is reproduced. The relation between the writing speed and the reading speed is as described hereinbefore. The aural signal $AS_3$ reproduced in this manner is applied to the speaker 11 after being amplified by the amplifier 10.

Another preferred embodiment of the present invention will be described in detail with reference to FIGS. 4 to 6. This second embodiment is substantially the same as the first embodiment except that a zero cross synchronizing circuit ZCS is added to the first embodiment. This zero cross synchronizing circuit acts to effect zero cross synchronization of the aural signal output of the compressor, and such zero cross synchronized aural signal is transmitted from the transmitter in the calling station to the called station. In as much as the structure and function of the individual blocks except the zero cross synchronizing circuit are substantially the same as those in the first embodiment, any further description as to such blocks is unnecessary.

Figure 4:
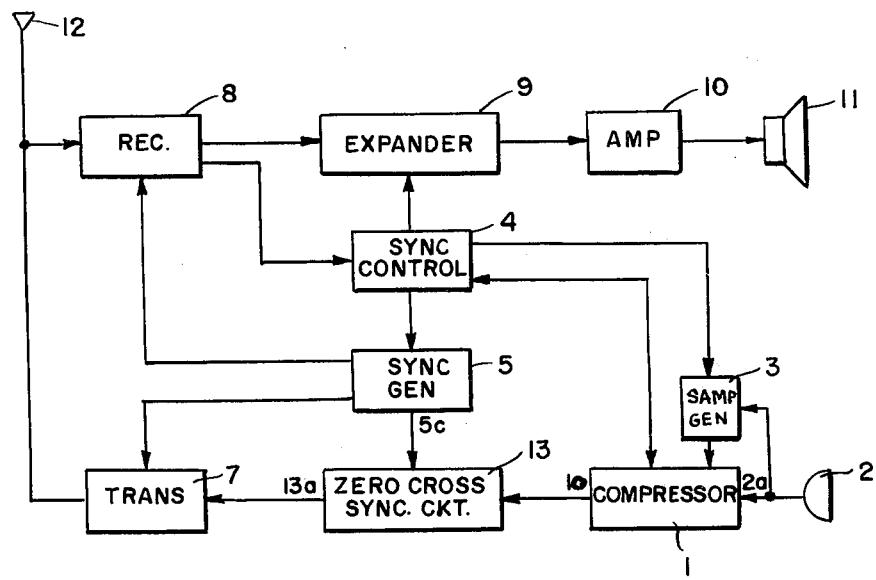
FIG. 4 is a block diagram of another preferred embodiment of the present invention.
Figure 5:
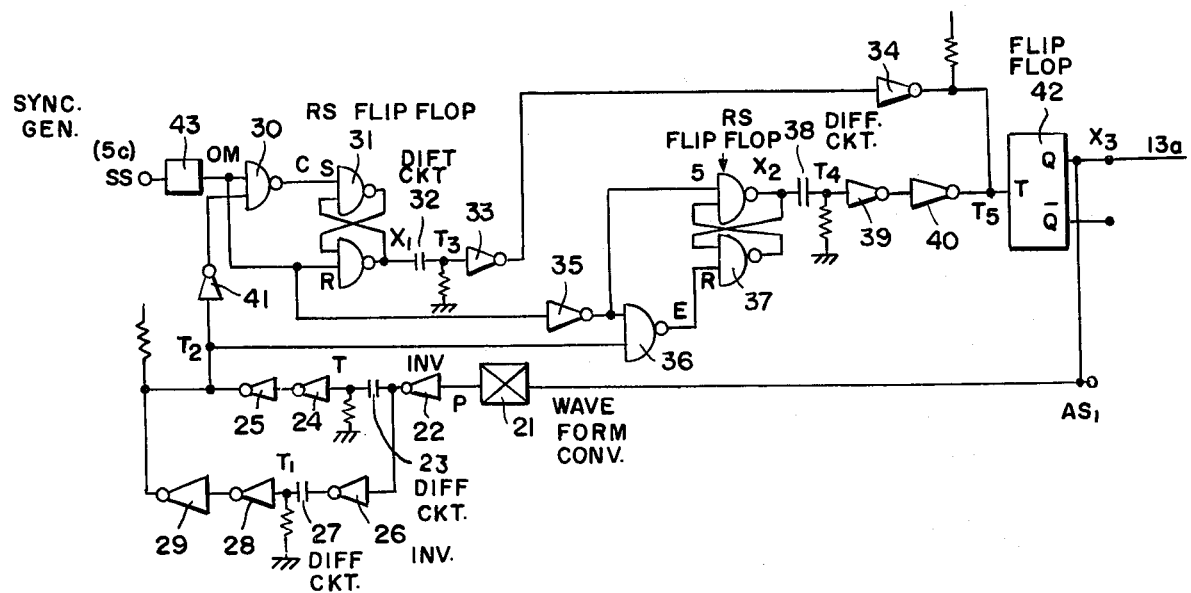
FIG. 5 is a circuit diagram of the zero cross synchronizing circuit shown in FIG. 4.

Referring to FIG. 4, an aural signal subjected to time division and compressed in the compressor 1 is applied over terminal 1o to the input for zero cross synchronizing circuit 13. In response to the application of such aural signal input, the zero cross synchronizing circuit 13 produces a signal corresponding to the zero level of the aural signal, and this signal is utilized together with the synchronizing signal applied over terminal Sc from the synchronizing signal generator 5 so as to effect zero cross synchronization of the aural signal. The zero cross synchronized aural signal is then applied from the circuit 13 over terminal 13a to the transmitter 7.

The structure and operation of this zero cross syncrhonizing circuit 13 will be described in detail with reference to FIGS. 5 and 6. Referring to FIG. 5, a waveform converter 21 converts the waveform of an aural signal output $AS_1$ of the compressor 1 into a rectangular waveform P as shown in FIG. 6. The output of the waveform converter 21 is applied to an inverter 22. A first differentiation circuit 23 differentiates the output signal of the inverter 22 at the falling edge of this inverted output signal to provide trigger pulses T corresponding to the zero cross points of the aural signal $AS_1$. The output signal of the inverter 22 is also applied through another inverter 26 to a second differentiation circuit 27. Thus, the output of the inverter 26 has a phase difference of 180° relative to the input to the first differentiation circuit 23, and the second differentiation circuit 27 differentiates such output of the inverter 26 at the falling edge of the rectangular waveform to provide trigger pulses $T_1$ corresponding to the zero cross points of the aural signal $AS_1$. Therefore, when the outputs of these differentiation circuit 23 and 27 are combined together, the resultant composite signal consists of trigger pulses $T_2$ which show a 1:1 correspondence to the zero cross points of the aural signal $AS_1$. The output of the first differentiation circuit 23 is applied to the next stage through another inverter 24 and an open-collector inverter 25, while the output of the second differentiation circuit 27 is applied to the next stage through another inverter 28 and another open-collector inverter 29. The principal function of the inverters 24, 28 and open-collector inverters 25, 29 is to shape the signal waveform.

A monostable multivibrator 43 is triggered by the rising edge of the synchronizing signal SS applied from the synchronizing signal generator 5 to generate a single pulse OM having a suitble duration. This pulse duration is determined by the time constant of the monostable multivibrator 43. In the second embodiment, the time constant of the monostable multivibrator 43 is selected so that the duration of the single pulse OM is slightly shorter than that of the synchronizing pulse SS. A NAND gate 30 is connected at one input terminal thereof to the output terminal of the monostable multivibrator 43 and at the other input terminal thereof to another inverter 41 to which the composite output pulse $T_2$ of the differentiation circuit 23 and 27 is applied. An R-S flip-flop 31 is connected at the S input terminal thereof to the output terminal of the NAND gate 30 and at the R input terminal thereof to the output terminal of the monostable multivibrator 43. A third differentiation circuit 32 differentiates the $\overline{Q}$ output signal of the R-S flip-flop 31 at the falling edge of the output waveform. The output terminal of this differentiation circuit 32 is connected to the T input terminal of a T flip-flop 42 through a wave shaper consisting of an inverter 33 and an open-collector inverter 34.

Another NAND gate 36 is connected at one input terminal thereof to the monostable multibrator 43 through another inverter 35 and at the other input terminal thereof directly to the point at which the composite output of the differentiation circuit 23 and 27 appears. Another R-S flip-flop 37 is connected at the S input terminal thereof to the output terminal of the inverter 35 and at the R input terminal thereof to the output terminal of the NAND gate 36. A fourth differentiation circuit 38 differentiates the Q output signal of the R-S flip-flop 37 at the falling edge of the output waveform. The output terminal of this differentiation circuit 38 is connected to the T input terminal of the T flip-flop 42 through a wave shaper consisting of an inverter 39 and an open-collector inverter 40 as in the case of the differentiation circuit 32. The T flip-flop 42 is connected at the Q output terminal thereof to the transmitter 7.

Figure 6:
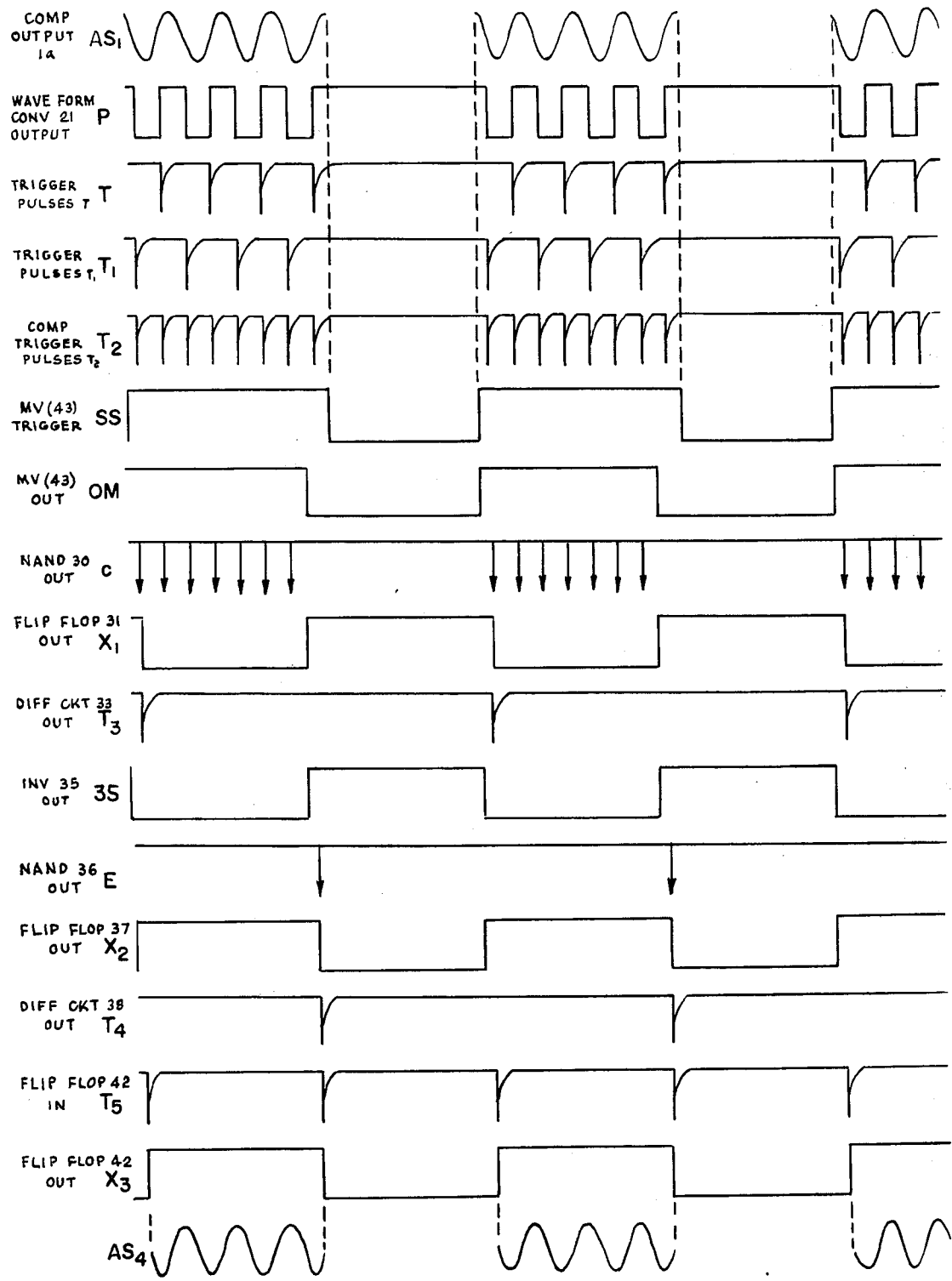
FIG. 6 shows waveforms appearing at various parts of FIGS. 4 and 5.

An aural signal $AS_1$ applied to the waveform converter 21 in the zero cross synchronizing circuit 13 is converted into a rectangular waveform P as shown in FIG. 6. This rectangular waveform P is applied through the inverter 22 to the first differentiation circuit 23 to be differentiated at the falling of waveform thereby providing trigger pulses T corresponding to the zero cross points of the aural signal $AS_1$. The rectangular waveform P is also applied through the inverters 22 and 26 to the second differentiation circuit 27 in the form which has a phase difference of 180° relative to the input signal applied to the first differentiation circuit 23. Such rectangular waveform is also differentiated by the second differentiation circuit 27 at the falling edge of the waveform to provide trigger pulses $T_1$ corresponding also to the zero cross points of the aural signal $AS_1$. Therefore, the composite trigger pulse $T_2$ of the trigger pulses T and $T_1$ has a waveform which shows completely a 1:1 correspondence to the zero cross points of the aural signal $AS_1$.

In the meantime, the monostble multivibrator 43 is triggered by the rising edge of the synchronizing signal SS, which is synchronous with the aural signal $AS_1$, thereby generating a single pulse OM of predetermined duration. This pulse OM is applied to one input terminal of the NAND gate 30, and a pulse output C having a wave form as shown in FIG. 6 appears from the NAND gate 30. In this case, the other input to the NAND gate 30 is the composite pulse signal $T_2$. Therefore, the $\overline{Q}$ output signal $X_1$ of the first R-S flip-flop 31 has a waveform which falls in synchronism with the first pulse of the pulse signal C and which reset in synchronism with the fall of the waveform of the pulse OM as shown in FIG. 6. This $\overline{Q}$ output signal $X_1$ of the first R-S flip-flop 31 is differentiated by the third differentiation circuit 32 at the falling edge of the waveform to provide a trigger pulse $T_3$. This trigger pulse $T_3$ corresponds to the firt zero cross point of the aural signal $AS_1$.

The pulse OM is also applied to one input terminal of NAND gate 36 through the inverter 35, and the composite trigger pulse $T_2$ is applied directly to the other input terminal of the NAND gate 36. As a result, a pulse output signal E having a wavefrom as shown in FIG. 6 appears from the NAND gate 36. Therefore, the output signal $X_2$ appearing at the Q output terminal of the second R-S flip-flop 37 has a waveform which rises in synchronism with the rise in the waveform of the pulse OM and falls in synchronism with the first fall in the waveform of the pulse E apearing after disappearance of the pulse OM. Thus, the output signal $X_2$ appearing at the Q ouput terminal of the second R-S flip-flop 37 corresponds to the zero cross point which occurs immediately before the interruptin of the aural signal $AS_1$, due to the fact that the duration of the pulse OM is selected to be slightly shorter than the duration of the synchronizing pulse SS which is equal to the duration of the aural signal portion $AS_1$. This output signal $X_2$ is then differentiated by the fourth differentiation circuit 38 at the falling edge of the waveform to provide a trigger pulse $T_4$. The trigger pulse $T_3$ and the trigger pulse $T_4$ are applied as a trigger pulse $T_5$ to the T input terminal of the T flip-flop 42. Thus, the output signal $X_3$ appearing at the Q output terminal of the T flip-flop 42 has a waveform which rises in synchronism with the trigger pulse $T_3$ and falls in synchronism with the trigger pulse $T_4$. The aural signal $AS_1$ subjected to the zero cross synchronization in the manner above described is applied as an aural signal waveform $AS_4$ to the transmitter 7 as shown in FIG. 6.

In the aural signal waveform $AS_4$ thus produced, the first and last portions of the information contained in the original aural signal $AS_1$ are removed and the aural information contained in these portions are not transmitted. However, this does not pose any substantial practical problem since such period of time is very short.

We claim:

1. A radio communication system for simultaneous telecommunication betweeen a calling station and a called station comprising:
    a transmitter;
    a receiver;
    a sampling pulse generator for generating sampling pulses for dividing an aural signal at a suitable time division rate;
    a compressor for suitably compressing said sampled aural signal with respect to the time axis including memory means in which said sampled aural signal is written to be read out at a reading speed higher than the writing speed;
    a synchronizing signal generator for generating a synchronizing signal synchronous with said aural signal compressed by said compressor for alternately turning on and off said transmitter and said receiver;
    an expander connected to said receiver for expanding the time-divided and compressed aural signals received by said receiver,
    and a zero cross synchronizing circuit comprising first circuit means for generating a first trigger pulse corresponding to each of the zero cross points of said compressed aural signal in response to the application of said compressed aural signal from said compressor, second circuit means for generating a second trigger pulse corresponding to the first zero cross point of said compressed aural signal appearing after said synchronizing signal, third circuit means for generating a third trigger pulse corresponding to the zero cross point of said compressed aural signal appearing immediately before the inversion of said synchronizing signal, and fourth circuit means for applying to said transmitter the aural signal portion appearing between the time at which said second trigger pulse generated by said second circuit means is applied thereto and the time at which said third trigger pulse generated by said third circuit means is applied thereto.

2. A radio communication system as claimed in claim 1, wherein said first circuit means comprises a waveform converter for generating a rectangular waveform by converting the waveform of said compressed aural signal in response to the application of said compressed aural signal from said compressor, a first differentiation circuit for differentiating one end of the waveform output by said converter, and a second differentiation circuit for differentiating a second end of said waveform which has a phase difference of 180° relative to said one end, the output terminal of said second differentiation circuit being connected in common with that of said first differentiation circuit.

3. A radio communication system as claimed in claim 1, wherein said second circuit means comprises a first R-S flip-flop enabled in response to the application of said first trigger pulse corresponding to the first zero cross point of said compressed aural signal appearing after said synchronizing signal from said synchronizing signal generators, and a third differentiation circuit for differentiating the output of said first R-S flip-flop thereby generating a second trigger pulse, and said third circuit means comprises a monpstble multivibrator triggered in response to the application of said synchronizing signal from said synchronizing signal generator thereby generating a single pulse having a duration slightly shorter than that of said synchronizing signal, a second R-S flip-flop operative in reponse to the application of a first trigger pulse corresponding to the first zero cross point of said compressed aural signal appearing after the inversion of said monostable multivibrator as a result of lapse of the duration of said pulse generated by said monostable multivibrator, and a fourth differentiation circuit for generating a third trigger pulse corresponding to the first zero cross point of said compressed aural signal appearing after the inversion of said monostble multivibrator.

4. A radio communication system as claimed in claim 1, wherein said fourth circuit means comprises a T flip-flop for generating a pulse having a waveform which rises in synchronism with said second trigger pulse generated by said second circuit means and falls in synchronism with said third trigger pulse generated by said third circuit means, the output terminal of said compressor being connected to one of the output terminals of said fourth circuit means at which said pulse appears.

* * * * *

UNITED STATES PATENT OFFICE
CERTIFICATE OF CORRECTION

PATENT NO. : 4,034,295
DATED : July 5, 1977
INVENTOR(S) : Katsutaka Kotezawa; Toshimi Onodera; Setsuo Hayashi; Fujio Shimanuki It is certified that error appears in the above-identified patent and that said Letters Patent are hereby corrected as shown below:

```
Col. 2, line 63,  "degreaded" should be --degraded--;
Col. 3, line 27,  "intput" should be --input--;
Col. 3, line 44,  "sample" should be --example--;
Col. 3, line 47,  "the" should be --be--;
Col. 3, line 58,  "fom" should be --from--;
Col. 4, line 7,   "inventin" should be --invention--;
Col. 4, line 11,  after "la" insert --and--;
Col. 4, line 22,  "low" should be --Law--;
Col. 4, lines 31 and 32, "predermined" should be
                  --predetermined--;
Col. 4, line 38,  "whic" should be --which--;
Col. 4, line 66,  "redad" should be --read--;
Col. 6, line 32,  "from" should be --form--;
Col. 6, line 40,  "referes" should be --refers--;
Col. 7, line 22,  "appled" should be --applied--;
Col. 10, line 60, "end" should be --edge--;
Col. 10, line 62, "end" should be --edge--; and
Col. 11, line 8,  "monostble" should be --monostable--.
```

Signed and Sealed this

Twenty-seventh Day of September 1977

[SEAL]

Attest:

RUTH C. MASON
Attesting Officer

LUTRELLE F. PARKER
Acting Commissioner of Patents and Trademarks